Dec. 16, 1952 J. HENCHERT 2,621,622
METHOD OF FORMING RINGLIKE BODIES
Filed March 14, 1946 4 Sheets-Sheet 1
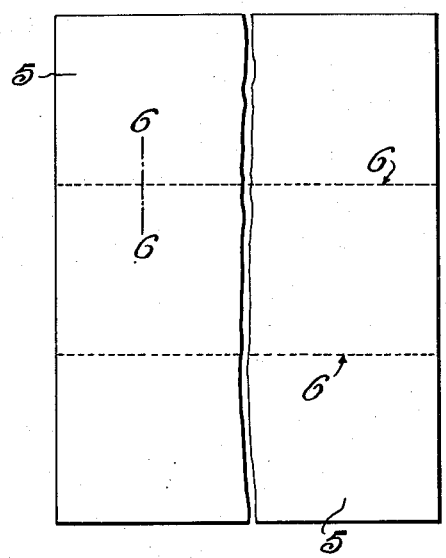
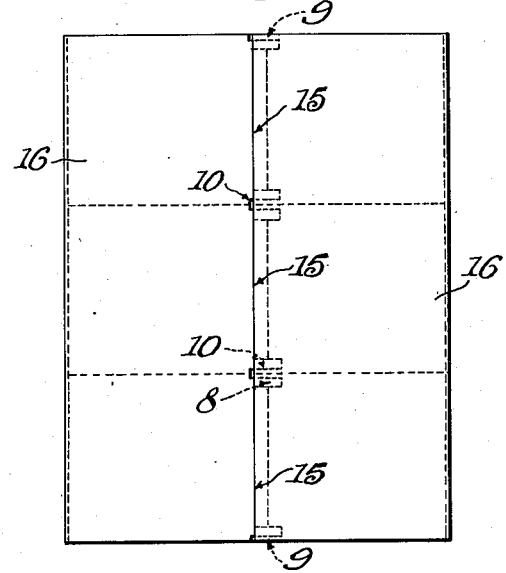
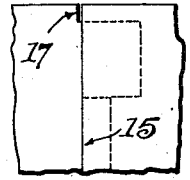
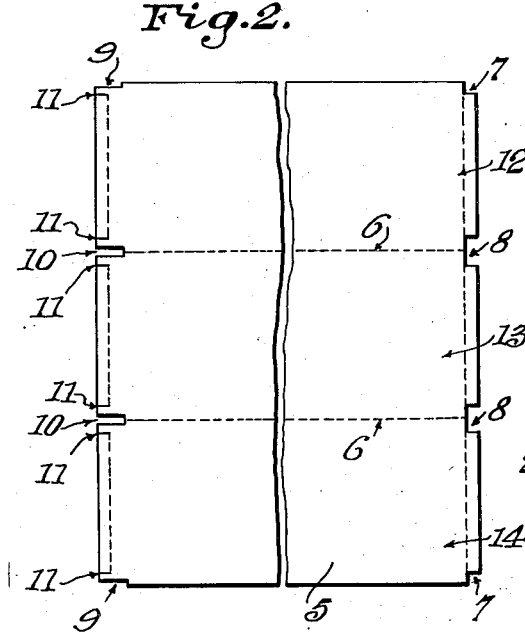
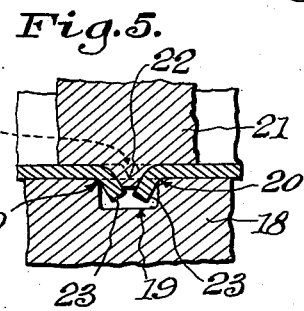
Inventor
John Henchert
By Mason, Porter & Diller
Attorneys

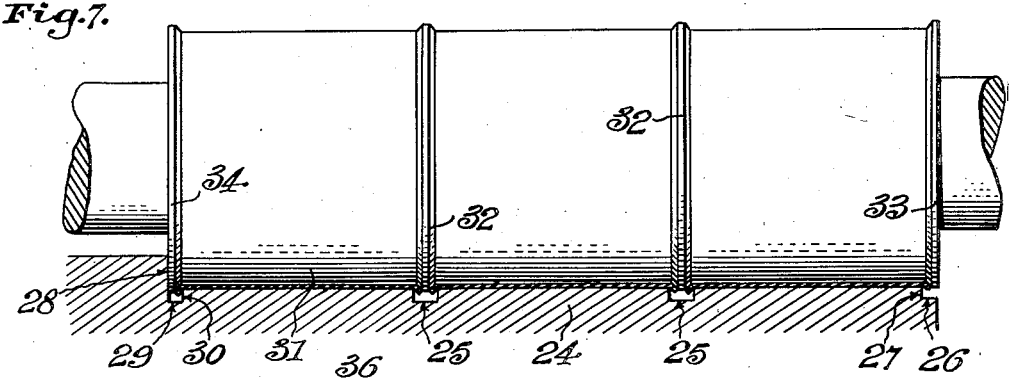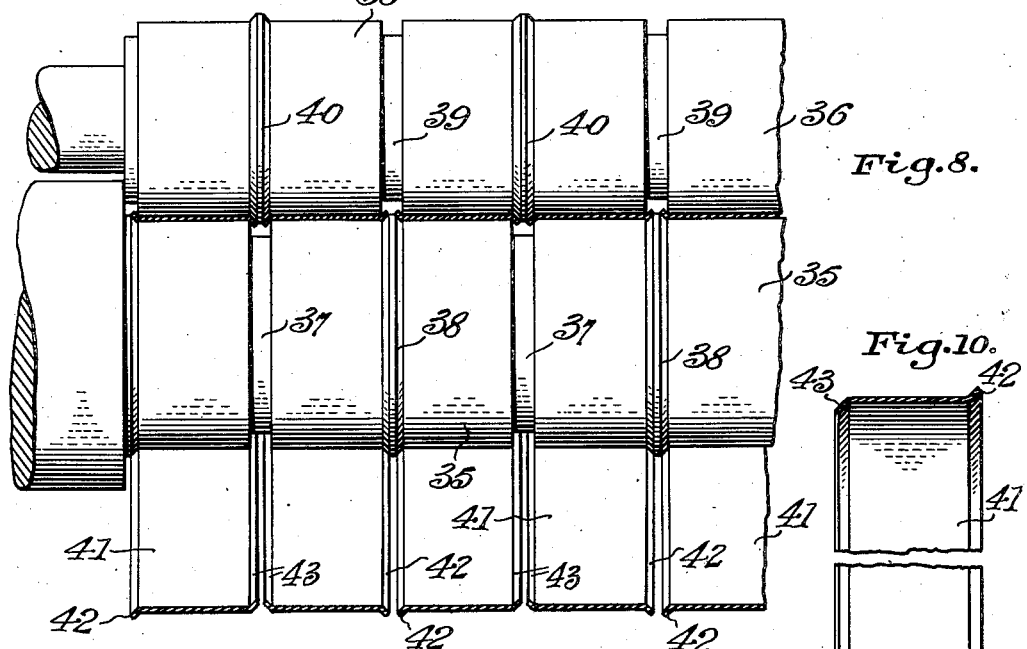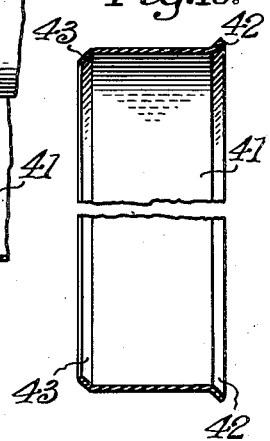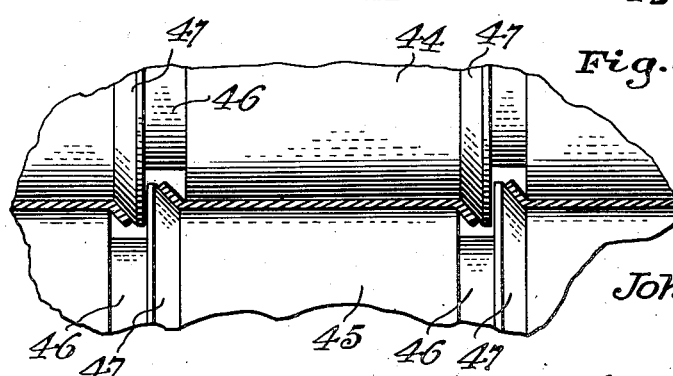

Inventor
John Henchert
By Mason, Porter & Diller
Attorneys

Dec. 16, 1952 J. HENCHERT 2,621,622
METHOD OF FORMING RINGLIKE BODIES
Filed March 14, 1946 4 Sheets-Sheet 4

Inventor
John Henchert
By Mason, Porter & Diller
Attorneys

Patented Dec. 16, 1952

2,621,622

UNITED STATES PATENT OFFICE 2,621,622

METHOD OF FORMING RINGLIKE BODIES

John Henchert, Chicago, Ill., assignor to Continental Can Company, Inc., New York, N. Y., a corporation of New York Application March 14, 1946, Serial No. 654,289

17 Claims. (Cl. 113—116)

The invention relates generally to the art of metal working and primarily seeks to provide a novel method of forming low height can bodies, can collars, rings or the like hereinafter referred to generally as ring-like bodies.

Can bodies which are cylindriform in shape and open at their ends usually are formed on body makers wherein blanks are fed one by one onto and along feedways to and through notching, edging and forming stations, and at said forming station they are bent or folded about a forming horn and have their marginal edges brought together to form a side seam. After the bodies are thus shaped they are fed along the horn to a soldering station whereat the side seams thereof are solder bonded.

Efforts have been made to follow the above mentioned procedure in the making of short or low height can bodies, and also in the formation of can collars and rings, but in these attempts much difficulty has been experienced in feeding the ring-like bodies or collars along the feedway and bumping horn and along the solder horse or through the outside horse when such is employed, because of the tendency of said relatively narrow width bodies to cock and bind. It has been found also that when the formed bodies were ejected onto the collar conveying chain the blast of cooling air tends to displace the bodies so that they cannot be handled with accuracy. These adverse conditions become more pronounced as the diameter of the bodies increases, or as their width decreases, and since it is necessary to slow down the body maker in order to maintain better control of the bodies, production speed necessarily drops.

It is, therefore, an object of the present invention to provide a novel method of forming ring-like bodies rapidly and inexpensively and in a manner which will avoid the difficulties mentioned.

Another problem solved by the present invention is that of accurately sub-dividing a sheet metal tubular member, either devoid of or including a side seam, into a plurality of divisional rings or bands of uniform width at a high productive speed.

It has been known heretofore to sever rings directly from sheet metal tubes by employing a plurality of cooperating shearing elements positioned in side and outside the tube. One of the difficulties encountered with this practice, and attributable, at least in part, to the deflection of the body resulting from the cooperating action of the cutting elements, was that of cutting the sheet metal body accurately along parallel lines around its circumference so that the beginning and end of the cuts were in exact alignment. Accentuating this difficulty, was the critical alignment of the axis of the can with the axis of the shearing element necessary to be maintained in order to cut the edges of the rings to the desired parallelism. This difficulty is avoided by the present invention in the steps of providing tubular members having parallel circumferential score lines thereon defining the individual ring-like bodies to be formed, and rupturing said members along the score lines to divide them into the desired number of individual ring-like bodies. While the invention broadly comprehends the use of seamless tubular members as well as tubuar members having side seams, and also the scoring of such tubular members as well as the scoring of the flat blanks from which tubular members having side seams may be formed, it is preferred that the tubular members be prepared by first scoring the flat blanks, which is more accurately performed so that when the tubular body is formed therefrom the ends of the scored lines are disposed in alignment, and then forming the scored blanks into tubular members.

An object of the invention is to provide a method of the character stated in which a multiple of ring-like bodies are formed from a flat blank transversely scored to form ring-like body sections or widths and having their ends joined to form an elongated tubular member, said scoring being of sufficient depth to permit division of the tubular member into a multiple of ring-like bodies by mere rupturing at the score lines and without any shear cutting.

Another object of the invention is to provide a method of the character stated in which the tubular members are so formed and divided into ring-like bodies as to provide multiples of shallow or low height can bodies of the lock and lap seam type with or without key opening tongues.

Another object of the invention is to provide a method of the character stated in which the rupturing of the multiple section tubular member at the scoring therein is so performed as to simultaneously provide a flange or turned edge portion at an end of a ring-like body at each side of a given score line.

Another object of the invention is to provide a method of the character stated in which the rupturing of the multiple section tubular member at the scoring therein is so performed as to provide a multiple of can bodies and simultaneously flange or turn the edge portions of each thereof at both ends.

Another object of the invention is to provide a method of the character stated in which a multiple of can collars are formed from a multiple section tubular member deeply scored at collar widths therealong, and the rupturing of the scoring is so performed as to provide individual collars each having an inwardly turned flange at one end and an outwardly turned flange at its other end.

Another object of the invention is to provide a method of the character stated in which blank edges brought together in the formation of the multiple section tubular member are so formed that only one stock thickness has to be contended with during the division of the tube into a multiple of ring-like bodies.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating a blank from which a plurality of can bodies of the lock and lap seam type may be formed, the blank being transversely and deeply scored to provide a plurality of can body length sections.

Figure 2 is a plan view illustrating the blank shown in Figure 1 after it has been notched and slit.

Figure 3 is a side elevation illustrating a tubular member formed from the multiple body blank shown in Figure 2 by bringing the notched and slit marginal edge portions thereof together in the form of side seams of the lock and lap type.

Figure 4 is an enlarged fragmentary side elevation illustrating one end of one of the lock and lap side seams.

Figure 5 is an enlarged fragmentary vertical longitudinal section illustrating the cooperation of a parting roll and an annular backing surface in effecting the simultaneous division and flanging of individual can bodies, collars or ring sections.

Figure 6 is an enlarged fragmentary sectional view taken on the line 6—6 on Figure 1.

Figure 7 is a fragmentary longitudinal sectional view illustrating the simultaneous parting and flanging of a multiple of can body sections, formed as by the division of the tubular member shown in Figure 3.

Figure 8 is a fragmentary longitudinal sectional view illustrating the manner in which a multiple section tubular member can be divided into ring-like body lengths in a manner for simultaneously turning inwardly and outwardly directed flanges at the respective ends of each said body length.

Figure 9 is a fragmentary view similar to Figure 8 illustrating another manner in which the tubular member can be divided into ring-like body lengths in a manner for simultaneously turning inwardly and outwardly directed flanges at the respective ends of each said body length.

Figure 10 is a sectional view illustrating one of the ring-like body lengths completed as in Figure 8 or 9 to provide an outwardly turned flange at one end and an inwardly turned flange at the other end thereof.

Figure 11:
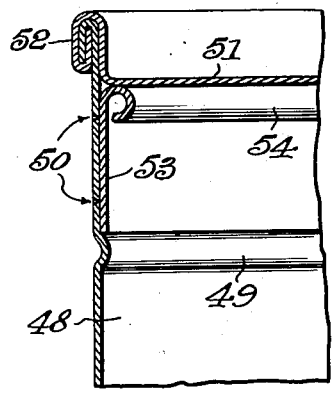
Figure 11 is a fragmentary vertical cross sectional view illustrating a portion of a container of the rip strip type having a collar inserted therein.

In the example of disclosure of the invention herein made, the method of forming shallow or short can bodies will first be described.

According to this method, a blank 5 long enough to make a multiple of can bodies is employed, and such a blank is illustrated in Figure 1. The blank is deeply scored transversely as at 6 to define can body lengths. This scoring is so deep as to permit division of the blank sections at the score lines by mere pressure rupturing of the metal, as distinguished from shear cutting. The score may be so deep as to leave .0015″ of metal or less and may even pass through the metal of the blank at some places. This deep scoring is illustrated in detail in Figure 6.

After the scoring of the blank to provide multiple blank sections in the manner illustrated in Figure 1, the blank is notched at its corners at one side thereof as at 7, and intermediately of said corners and centered on the score lines 6 as at 8. The blank is also notched at the other side at its corners as at 9, and intermediately of said corners and centered on the score lines 6 as at 10. At the last mentioned side of the blank, slits 11 also are provided adjacent each notch 9 and 10. It will be apparent by reference to Figure 2 that the score lines 6 and the ends of the blank define between them individual can body blank sections 12, 13 and 14, and these blank sections are of the lock and lap seam type.

In the formation of the can bodies, the hook and lap portions of the multiple section blank shown in Figure 2 are brought into cooperative relation as at 15 in Figure 3 to form a tubular member 16 of multiple can body length. The lock and lap side seam structures may be solder bonded in the usual manner. In this particular illustration, the tubular member is of triple can body length. An enlarged fragment of the lock and lap side seam is illustrated in Figure 4, and in this illustration it will be observed that the notches 9 and 10 are so formed as to provide a slight gap 17 at the end extremity of each seam. This clearance or gap 17 serves to assure against overlapping of metal at this point such as would hinder efficient flanging or curling operations and also to assist in the parting of the multiple bodies.

In order to divide the tubular member 16 in the formation of individual can bodies, said sleeve may be placed on a backing roll 18 having at least one annular groove 19 in its outer face presenting longitudinally spaced corners or shoulders 20. By now applying a parting roll 21 with its annular parting rib 22 pressed against a score line 6 aligned over the backing roll groove 19, and by rotating said rolls, the rib will be caused to rupture the tubular member at the score line and simultaneously turn flanges 23 in the outward direction into the groove 19 and over the corners or shoulders 20.

In Figure 7 of the drawings, there is illustrated an apparatus in which the complete operation of severing a multiple of can bodies and the outward turning of flanges at the ends of each thereof can simultaneously be performed instead of the single score rupturing and flanging operation performed by the fragmentary apparatus illustrated in Figure 5. In this illustration, there is included a backing roll 24 having a plurality of intermediately disposed annular grooves 25 therein presenting longitudinally spaced corners or shoulders as in the case of the roll of Figure 5, an end clearance 26 providing a corner or shoulder 27, an inner abutment wall 28 and an annular groove 29 beside the same and providing a corner or shoulder 30. A parting roll 31 is provided and is equipped with a plurality of intermediate parting ribs 32 adapted to be centered over the ring grooves 25, an end rib 33 for cooperating with the end recess 26 and its shoulder 27, and another end rib 34 for cooperating with the annular groove 29 and its shoulder 30. It will be apparent by reference to Figure 7 that by placing the tubular member 16 of Figure 3 in an apparatus of this form, the multiple of can bodies can be simultaneously divided by rupturing of the score lines 6, and flanges may be simultaneously turned at the ends of the individual can bodies.

When it is intended to form collars or other ring-like bodies on which flanges turned in opposite directions at the respective ends are desirable, the method steps and apparatus illustrated in Figures 8 and 9 may be employed.

In Figure 8 there is shown an inner roll 35 and an outer roll 36. The inner roll 35 is equipped with suitably spaced, alternated annular grooves 37 and annular parting or rupturing ribs 38, and the outer roll 36 is similarly equipped with annular grooves 39 for cooperating with the inner roll ribs 38 and annular parting or rupturing ribs 40 for cooperating with the inner roll grooves 37. When the rolls 35 and 36 are rotated and brought together as indicated in Figure 8, they will serve to rupture the score lines and divide the tubular member into a plurality of collars or ring-like bodies 41 such as is illustrated in detail in Figure 10, each having an outwardly directed flange 42 at one end and an inwardly directed flange 43 at its other end.

In the modification shown in Figure 9, the method of simultaneously dividing the tubular member into a multiple of collars or ring-like bodies is performed by cooperation of inner and outer rolls 44 and 45 each having suitably spaced and alternated grooves 46 and ribs 47, the groove in each roll being opposite a rib on the opposing roll, and each rib being disposed immediately beside a groove in the same roll. In this form of apparatus the rib sets of the opposing rolls, each set comprising two ribs 47 arranged in side by side relation, cooperate in rupturing the tubular member at the score lines and simultaneously turning the flanges in opposite directions as in Figure 9.

It will be apparent that the apparatus disclosed in Figure 8, or that disclosed in Figure 9, can be employed in the simultaneous formation and flanging of collars or ring-like bodies such as are shown in Figure 10.

In Figures 11 through 18 is illustrated a method of forming collars which are to be curled inwardly at one end only.

In Figure 11, there is shown one form of container having a rip strip and an inserted collar of the general character hereinbefore referred to. The body portion of the container is indicated at 48. The body portion is beaded as indicated at 49 so that the bead projects inwardly from the upper end of the body portion. The metal forming the body wall between the bead and the upper end thereof is scored along the lines 50 which define between them the usual rip strip having a projecting tongue at the side seam to which a key may be applied for rupturing the metal along the score lines and thus releasing the closure end from the body of the container. The closure end is indicated at 51 and said end is secured to the body wall by the usual form of double seam indicated at 52.

Inserted in the container body is a collar 53. This collar has a cylindrical portion which is dimensioned so that it frictionally fits snugly within the container body. The lower end of the collar engages the bead 49, and the upper end of the collar is formed into a hollow curl 54. The collar is firmly held in the body wall, and when the rip strip is removed, said collar remains as a permanent part of the body wall. Collars of this general construction are well known in the art, and as previously stated the present invention is directed more particularly to the method of making the collars. In Figures 12 through 18 is illustrated another method of forming collars of this type.

Figure 12:
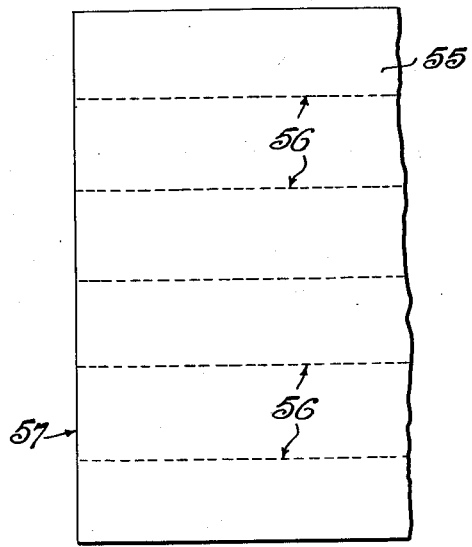
Figure 12 is a fragmentary plan view illustrating a metal blank which has been deeply scored along lines which are to be ruptured in dividing the blank into a plurality of collar strips.

According to the method disclosed in Figures 12 through 18, metal blank 55 is dimensioned so that it is of the same length as the length of a strip forming a collar, and may be, as shown in Figure 12, six times the width of the collars so that six collars may be made from each metal blank. The blank 55 is first scored along the lines 56. These score lines are very deep, as described hereinbefore and as illustrated in Figure 6, and are so positioned that they separate the blank into finished collars when the blank is ruptured along these lines.

Figure 13:
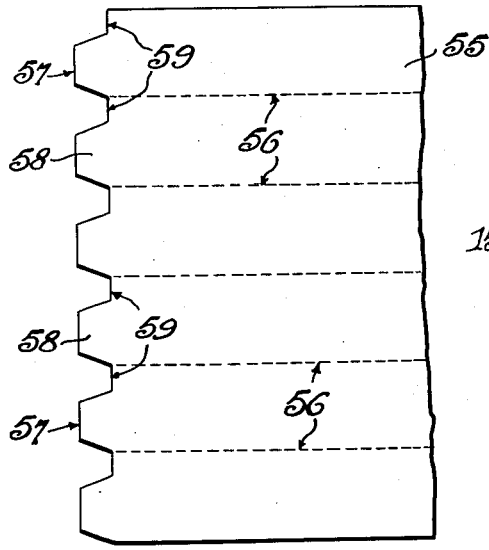
Figure 13 is a fragmentary plan view illustrating one end of the metal blank of Figure 12 after it has been notched to provide a novel end structure at one end of the collar strips.

After the blank has been scored, it is then notched as indicated in Figure 13. Sections are cut out of the end 57 of the blank so as to provide lapping portions 58 which are of less width than the width of the blank between the score lines. The blank is then formed into cylindrical shape and these portions 58 are lapped onto the outside of the opposite end of the blank in the manner shown in Figures 14 and 15. After the strip ends have been lapped in the manner shown, a solder bond is provided for securing the lapping sections together.

Figure 15:
Figure 15 is a detail sectional view taken on the line 15—15 on Figure 14.

As noted above, the lapping portions 58 are of less width than the distance between the score lines, and this leaves at the end of each strip width a portion 59 which may be disposed in abutting relation to the portion 60 on the other end of the metal blank. Prior to the solder bonding of the lapping portions, they are offset inwardly as indicated in Figure 15. The cylindrical blank thus formed is slipped onto a roll 61, provided with an abutment shoulder 62 and equidistantly spaced grooves 63.

Figure 16:
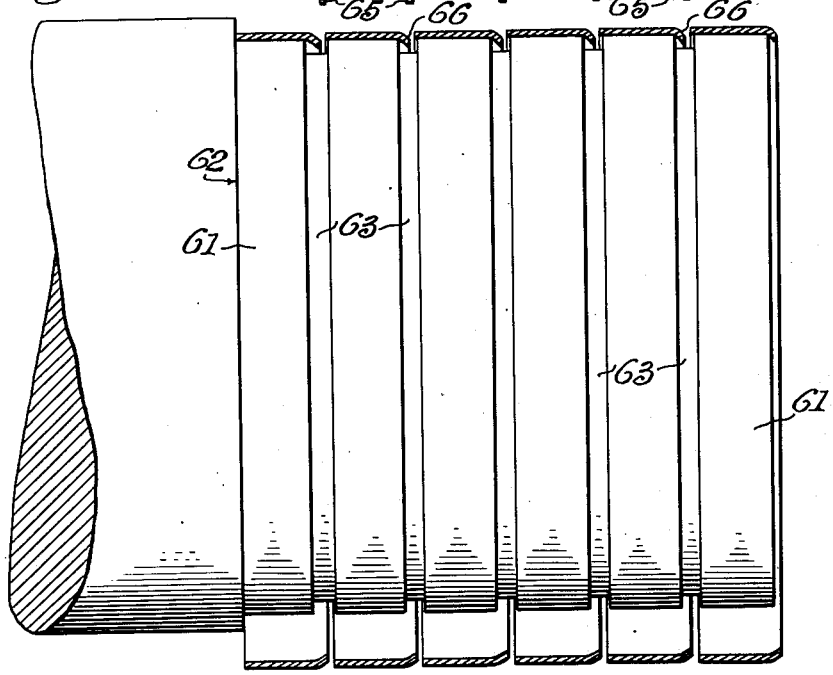
Figure 16 is a fragmentary side elevation showing portions of an apparatus for rupturing the metal blank of Figure 12 along the score lines to form a multiple of collars and simultaneously bend the collars inwardly at one end of each thereof.
Figure 17:
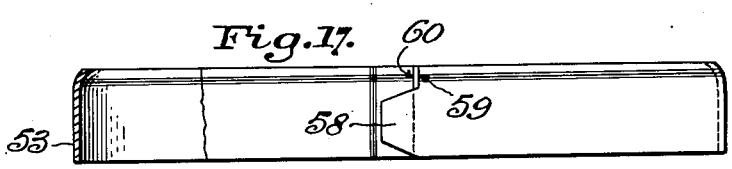
Figure 17 is a view partly in side elevation and partly in section of one of the collars after it has been separated from the collar section blank shell as indicated in Figure 16.
Figure 18:
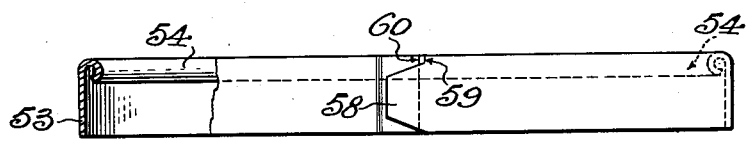
Figure 18 is a view partly in side elevation and partly in section showing the finished collar ready for insertion in a container body.

After the blank has been placed on the roll 61, then a rupturing roll 64 having spaced ribs 65 is brought into contact with the circular blank, and as the roll 61 and ruptured roll are rotated, the metal will be ruptured along the score lines, thus making of the circular blank six collar bands. The grooves 63 are of sufficient width so that when the ribs move down onto the metal for rupturing the same, the edge of the collar band will be given an initial inward bend as at 66, as shown in Figures 16 and 17. Each collar may then be subjected to a curling die or a curling roll, and the initial inward bend of the collar 53 is further shaped into a hollow bead or curl as indicated at 54 in Figure 18.

It will be noted that the edges 59 and 60 of the ends of the collar lie in the hollow bead and do not overlap so that there are no lapping sections in the upper portion of the hollow bead. The ends are in substantially abutted relation. The lapping sections 58 which are solder bonded together are disposed so that the outer circumference of the collar is substantially of uniform diameter at all points. This collar is so dimensioned that it is forced into the can body and there will therefore be a firm grip between the lower end of the collar and the body wall.

Figure 14:
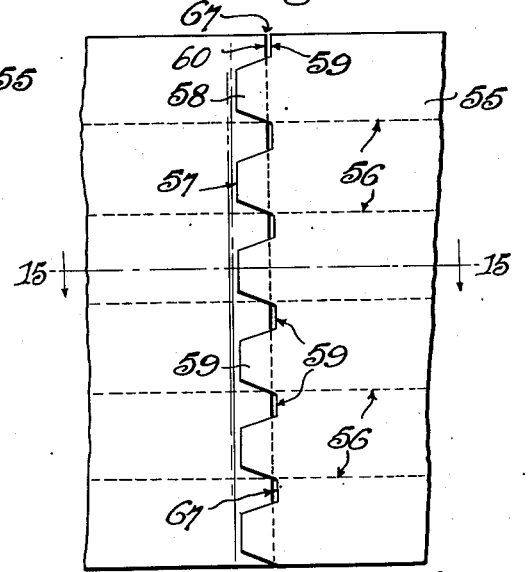
Figure 14 is a fragmentary view showing the metal blank of Figure 12 formed into a cylindrical shape with the ends thereof lapped and solder bonded.

It should also be noted by reference to Figure 14 that by reason of the placement of the notches in the manner illustrated, and the provision of the edge clearances at 67 only one stock thickness has to be contended with during the strip parting and curling operations.

In the last described form of the invention, the division or separation of the collars on the inner roll serves to bend one end only of the individual collars inwardly. This is accomplished by disposing the rupturing ribs close to one side wall of the grooves with which they cooperate in rupturing the deep scoring. However, this cooperation of the rupturing ribs and the groove is not to be confused with a shear cutting action, and the rupturing ribs do not cooperate as shear cutters with the groove shoulder which serves to support the end of the collar against inward bending. In the practical development of the invention, the rupturing ribs shown in Figure 16 may be so placed so that they are spaced inwardly a slight amount with respect to the transverse plane in which the cooperating, collar end supporting shoulders of the inner roll are disposed.

From the foregoing, it will be apparent that the method taught herein and the apparatus disclosed can be employed in the formation of various types of shallow or low height can bodies having lock and lap seams or lap seams, also that key opening can bodies or plain can bodies, can collars, or other ring-like bodies may be formed.

While example forms of this invention have been shown for purposes of illustration, it is to be understood that various changes in the details of construction and arrangement of parts, and also in the method steps may be made without departing from the spirit and scope of the invention as defined in the appended claims.

I claim:

1. The method of forming ring-like bodies which comprises, selecting a flat metal blank dimensioned so that it can be divided into a plurality of body strips, scoring the blank along parallel lines defining body strip widths, notching the blank along an end marginal edge portion to provide each strip with a projecting portion of less width than the strip with each said score line extending into one said notch, forming said blank into a cylindrical shape and lapping said projections onto the opposite marginal edge portion of the blank with each said projection overlapping less than its distance of projection from the main body only between score lines, securing said lapping portions together, and rupturing the metal along the score lines to divide the cylindrical blank into a multiple of ring-like bodies.

2. The method of forming ring-like bodies which comprises, preparing an elongated tubular member with a side seam including overlapped edge portions having at least one notch therein slightly deeper than the extent of the overlap and with at least one annular circumferentially continuous and readily ruptured deep score line effective to divide the tubular member into a multiple of body lengths and extending into said notch so as to provide only a single thickness of body stock at the position of the score line and the notch it enters in the tubular member, backing up said member at one face thereof opposite the score line with an annularly grooved body with the groove therein placed opposite said score line, and rolling an annular rupturing rib centrally against the score line to rupture the same and divide the tubular member into a multiple of ring-like bodies.

3. The method of forming ring-like bodies which comprises, preparing an elongated tubular member with a side seam including overlapped edge portions having notches therein and with annular readily ruptured deep score lines defining a multiple of body lengths along said member and extending into the notches said notches being of greater depth than the extent of the edge overlap so as to provide only a single thickness at the positions of the score lines, and engaging opposite faces of said member in rolling contact between inner and outer annular surfaces presenting an annular rupturing rib and a shoulder spaced endwise from said rib at the position of each score line with the ribs cooperating in sets and said shoulders being placed one immediately beside a rib and at opposite sides of each rib set thereby to cause the opposing ribs of each set to simultaneously engage and rupture a score line and turn the resulting edges of the tubular member one outwardly and the other inwardly against and over the shoulders at opposite sides of the respective rib set.

4. The method of forming ring-like bodies which comprises, forming an elongated tubular member having thereon annular circumferentially continuous and readily ruptured deep score lines defining at least three body lengths along said member, backing up said member at one face thereof opposite said score lines with an annularly grooved body with a groove therein placed opposite each said score line and extending at each side beyond each said score line, and simultaneously rolling dull annular rupturing ribs centrally against the score lines to rupture the same and divide the tubular member into a multiple of ring-like bodies and simultaneously turn both edges resulting from the rupturing of each score line into the groove in the form of flanges of a predetermined length and of like angularity.

5. The method of forming ring-like bodies which comprises, forming from a flat blank a tubular member a number of times the length of each body-to-be-formed and having an individual lock and lap side seam extending the length of each body-to-be-formed, said flat blank having edge notches therein at the positions of said seam laps and extending entirely across said laps and deep score lines extending thereacross and entering said notches between the individual lock and lap side seams, thereby to present no more than a single thickness of metal about the member at the score lines and between the individual lock and lap seams, and rupturing the deep score lines to form the desired multiple of individual bodies from said blank.

6. The method of forming ring-like bodies which comprises, preparing a flat blank a number of times the length of each body-to-be-formed with deep score lines extending thereacross and defining at least three body lengths and with a notch extending inwardly from an edge thereof at the position of each said score line, bringing the marginal edges of the blank together and securing them in the form of a side seam to provide a tubular member of a multiple of body lengths, with said notches placed to prevent overlapping of blank edge portions at the position of each notch and present a single thickness of stock at the position of the seam and at a distance lengthwise at each side of each score line, and rupturing the tubular member at and along each score line to divide the tubular member into the desired number of bodies and simultaneously turning a flange outwardly at each end of each said body.

7. The method of forming ring-like bodies which comprises, preparing a flat blank a number of times the length of each body-to-be-formed with at least one deep score line extending thereacross and dividing the blank into at least two body lengths and with a notch extending inwardly from an edge thereof at the position of each said score line, bringing the marginal edges of the blank together and securing them in the form of a side seam to provide a tubular member of the multiple of body lengths, with each notch placed to prevent overlapping of blank edge portions at the position of the notch and present a single thickness of stock at the position of the seam and at a distance lengthwise at each side of each score line, and rupturing the tubular member at and along each score line to divide the tubular member into the multiple of bodies and simultaneously turning a flange outwardly at each end of each said body.

8. The method of forming ring-like bodies which comprises, preparing a flat blank a number of times the length of each body-to-be-formed with deep score lines extending thereacross and defining at least three body lengths and with notches in at least one marginal edge thereof at the positions of said score lines so that the score lines extend thereinto, bringing the marginal edges of the blank together to form a side seam and a tubular member of a multiple of body lengths with the score line ends registering without overlapping of blank portions at the notches so as to present only a single thickness of body stock in the side seam at the position of each score line and notch, and simultaneously engaging rupturing ribs in rolling contact along all said score lines to rupture the member at the score lines and divide the tubular member into the desired number of bodies and simultaneously turn flanges at the ends of said bodies of a predetermined definite length and angularity.

9. The method of forming ring-like bodies which comprises, preparing a flat blank a number of times the length of each body-to-be-formed with at least one deep score line extending thereacross and dividing the blank into at least two body lengths and with a notch in a marginal edge thereof at the position of each said score line so that the score line extends thereinto, bringing the marginal edges of the blank together to form a side seam and a tubular member of the multiple of body lengths with the score line ends registering without overlapping of blank portions at the notch positioning so as to present only a single thickness of body stock in the side seam at the position of each score line and notch, and simultaneously engaging rupturing rib and flange turning means in rolling contact along each said score line and the tubular member end edges to rupture the member at each score line and divide the tubular member into the multiple of bodies and simultaneously turn flanges at the ends of said bodies of a predetermined definite length and angularity.

10. The method of forming ring-like bodies which comprises, forming an elongated tubular member having therein annular circumferentially continuous and readily ruptured deep score lines defining at least three body lengths along said member, backing up said member at one face thereof opposite said score lines with an annularly grooved body with a groove therein placed opposite each said score line and extending at each side beyond each said score line thereby to provide backing support for the tubular member adjacent and to each side of each score line in both directions and also freedom of said tubular member at each score line by reason of the clearance at each groove, and simultaneously rolling dull annular rupturing ribs centrally against the score lines to rupture the same and divide the tubular member into a multiple of ring-like bodies.

11. The method of forming ring-like bodies which comprises, preparing a flat blank a number of times the length of each body-to-be-formed with at least one deep score lining extending thereacross and dividing the blank into at least two body lengths, bringing the marginal edges of the blank together and securing them in the form of a side seam to provide a tubular member of the multiple of body lengths, backing up said member at one face thereof opposite said score lining with an annularly grooved body with a groove therein placed opposite each said score lining and extending at each side beyond each said score lining thereby to provide backing support for the tubular member adjacent and to each side of each score lining in both directions and also freedom of said tubular member at each score lining by reason of the clearance at each groove, and rolling dull annular rupturing rib means centrally against each score lining to rupture the same and divide the tubular member into the multiple of ring-like bodies.

12. The method of forming ring-like bodies which comprises, forming an elongated tubular member having thereon annular circumferentially continuous and readily ruptured deep score lines defining at least three lengths along said member, backing up said member at one face thereof opposite said score lines with an annularly grooved body with a groove therein placed opposite each said score line and extending at each side beyond each said score line thereby to provide backing support for the tubular member adjacent and to each side of each score line in both directions and also freedom of said tubular member at each score line by reason of the clearance at each groove, and simultaneously rolling dull annular rupturing ribs against the score lines to rupture the same and divide the tubular member into a multiple of ring-like bodies, and simultaneously turning at least one edge resulting from the rupturing of each score line into each groove in the form of a flange of a predetermined definite length and angularity.

13. The method of forming ring-like bodies which comprises, preparing a flat blank a number of times the length of each body-to-be-formed with at least one deep score lining extending thereacross and dividing the blank into at least two body lengths, bringing the marginal edges of the blank together and securing them in the form of a side seam to provide a tubular member of the multiple of body lengths, backing up said member at one face thereof opposite said score lining with an annularly grooved body with a groove therein placed opposite each said score lining and extending at each side beyond each said score lining thereby to provide backing support for the tubular member adjacent and to each side of each score lining in both directions and also freedom of said tubular member at each score lining by reason of the clearance at each groove, rolling dull annular rupturing rib means centrally against each score lining to rupture the same and divide the tubular member into the multiple of ring-like bodies, and simultaneously turning at least one edge resulting from the rupturing of each score lining into each groove in the form of a flange of a predetermined definite length and angularity.

14. The method of forming ring-like bodies which comprises forming an elongated tubular member having thereon annular circumferentially continuous readily ruptured deep score lines defining at least three body lengths along said member, and engaging opposite faces of said member in rolling contact between inner and outer annular surfaces each having annular grooves and annular rupturing ribs alternately spaced therealong in cooperating rib and groove pairs, with the ribs on each said annular surface directed outwardly opposite the grooves on the other said annular surface at the positions of the score lines so as to simultaneously rupture all score lines and turn at least one edge resulting from each said score line rupturing as a flange of a predetermined length and angularity into each groove.

15. The method of forming ring-like bodies which comprises forming an elongated tubular member having thereon annular circumferentially continuous and readily ruptured deep score lines defining at least three body lengths along said member, and engaging opposite faces of said member in rolling contact between inner and outer annular surfaces each presenting an annular rupturing rib and an annular shoulder spaced endwise from the respective rib by an annular groove at the position of each score line with the ribs cooperating in opposing sets and said shoulders being placed one immediately beside a rib and at opposite sides of each rib set with each rib on one said surface being disposed opposite a groove on the other said surface thereby to cause the opposing ribs of each set to simultaneously rupture all score lines and turn the two edges resulting from each score line rupturing as flanges of a predetermined length and angularity one outwardly and the other inwardly against and over the shoulders at opposite sides of the respective rib set.

16. The method of forming ring-like bodies which comprises, preparing a flat blank a number of times the length of each body-to-be-formed with deep score lines extending thereacross and defining at least three body lengths and with notches in at least one marginal edge thereof at the positions of said score lines so that the score lines extend thereinto, bringing the marginal edges of the blank together to form a side seam and a tubular member of a multiple of body lengths with the score line ends registering without overlapping of blank portions at the notches so as to present only a single thickness of body stock in the side seam at the position of each score line and notch and simultaneously engaging rupturing ribs in rolling contact along all said score lines to rupture the member at the score lines and divide the tubular member into the desired number of bodies and simultaneously turn flanges at the ends of said bodies.

17. The method of forming ring-like bodies which comprises, preparing a flat blank a number of times the length of each body-to-be-formed with at least one deep score line extending thereacross and dividing the blank into at least two body lengths and with a notch in at least one marginal edge thereof at the position of each said score line so that the particular score line extends thereinto, bringing the marginal edges of the blank together to form a side seam and a tubular member of a multiple of body lengths with the score line ends registering without overlapping of blank portions at the position of each notch so as to present only a single thickness of body stock in the side seam at the position of each score line and notch and engaging a rupturing rib in rolling contact along each score line to rupture the member at the score lining and divide the tubular member into the number of bodies and simultaneously turn flanges at the ends of said bodies.

JOHN HENCHERT.

REFERENCES CITED

The following references are of record in the file of this patent:

UNITED STATES PATENTS

| Number | Name | Date |
| --- | --- | --- |
| 197,596 | Brown | Nov. 27, 1877 |
| 517,223 | Lee | Mar. 29, 1894 |
| 517,580 | Livingston | Apr. 3, 1894 |
| 594,707 | Sahlin | Nov. 30, 1897 |
| 735,850 | Weber | Aug. 11, 1903 |
| 818,439 | Heindorf | Apr. 24, 1906 |
| 1,196,956 | Kelleher | Sept. 5, 1916 |
| 1,302,831 | Naugler | May 6, 1919 |
| 1,583,453 | Germain | May 4, 1926 |
| 1,767,755 | Grotnes | June 24, 1930 |
| 1,777,983 | Prahl | Oct. 7, 1930 |
| 1,941,046 | Prahl | Dec. 26, 1933 |
| 2,053,375 | Nicholas | Sept. 8, 1936 |
| 2,109,921 | Leach | Mar. 1, 1938 |
| 2,127,618 | Rimenschneider | Aug. 23, 1938 |
| 2,139,682 | Hothersall | Dec. 13, 1938 |
| 2,159,325 | Fabrice | May 23, 1939 |
| 2,222,842 | Humphrey | Nov. 26, 1940 |
| 2,251,810 | Smith | Apr. 5, 1941 |
| 2,227,746 | Clark | Jan. 7, 1941 |
| 2,288,896 | Fink | July 7, 1942 |

FOREIGN PATENTS

| Number | Country | Date |
| --- | --- | --- |
| 11,836 | Great Britain | of 1897 |